Sept. 25, 1934.	H. R. TEAR ET AL	1,974,550
LUBRICATING DEVICE
Filed March 25, 1932	3 Sheets-Sheet 3
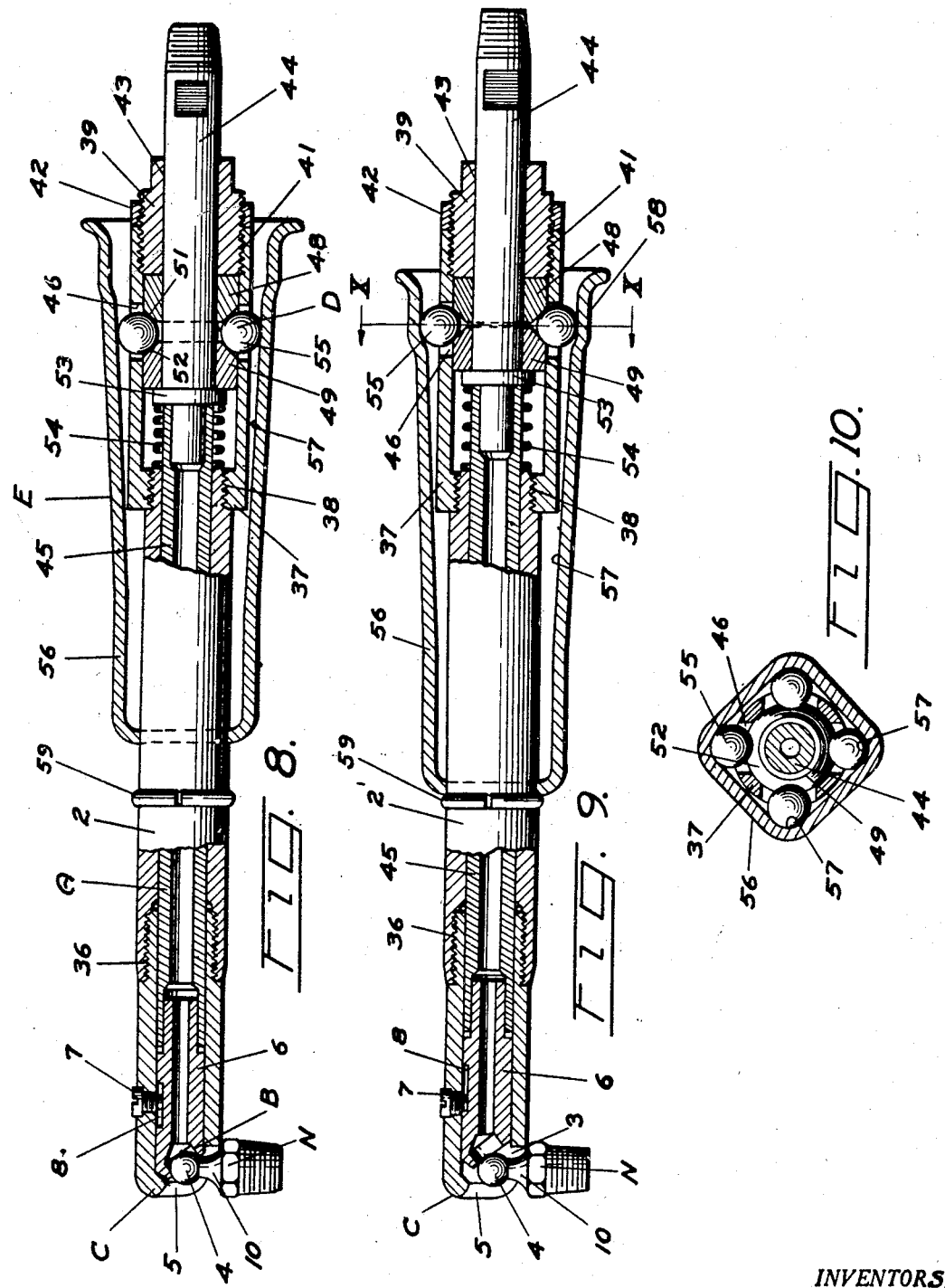
INVENTORS.
HARRY R. TEAR and LLOYD M. ANDREWS
BY John A. Watson
ATTORNEY.

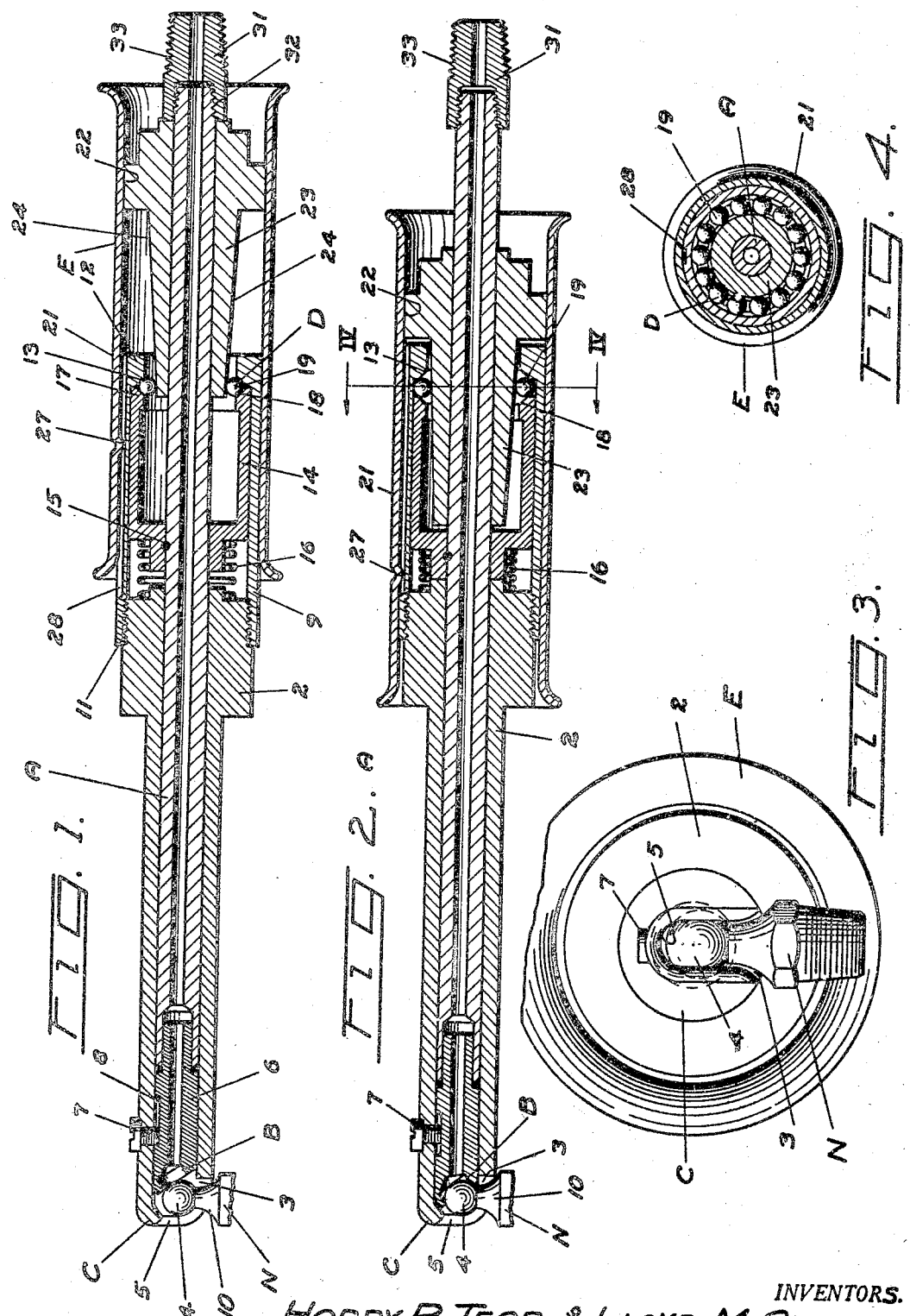

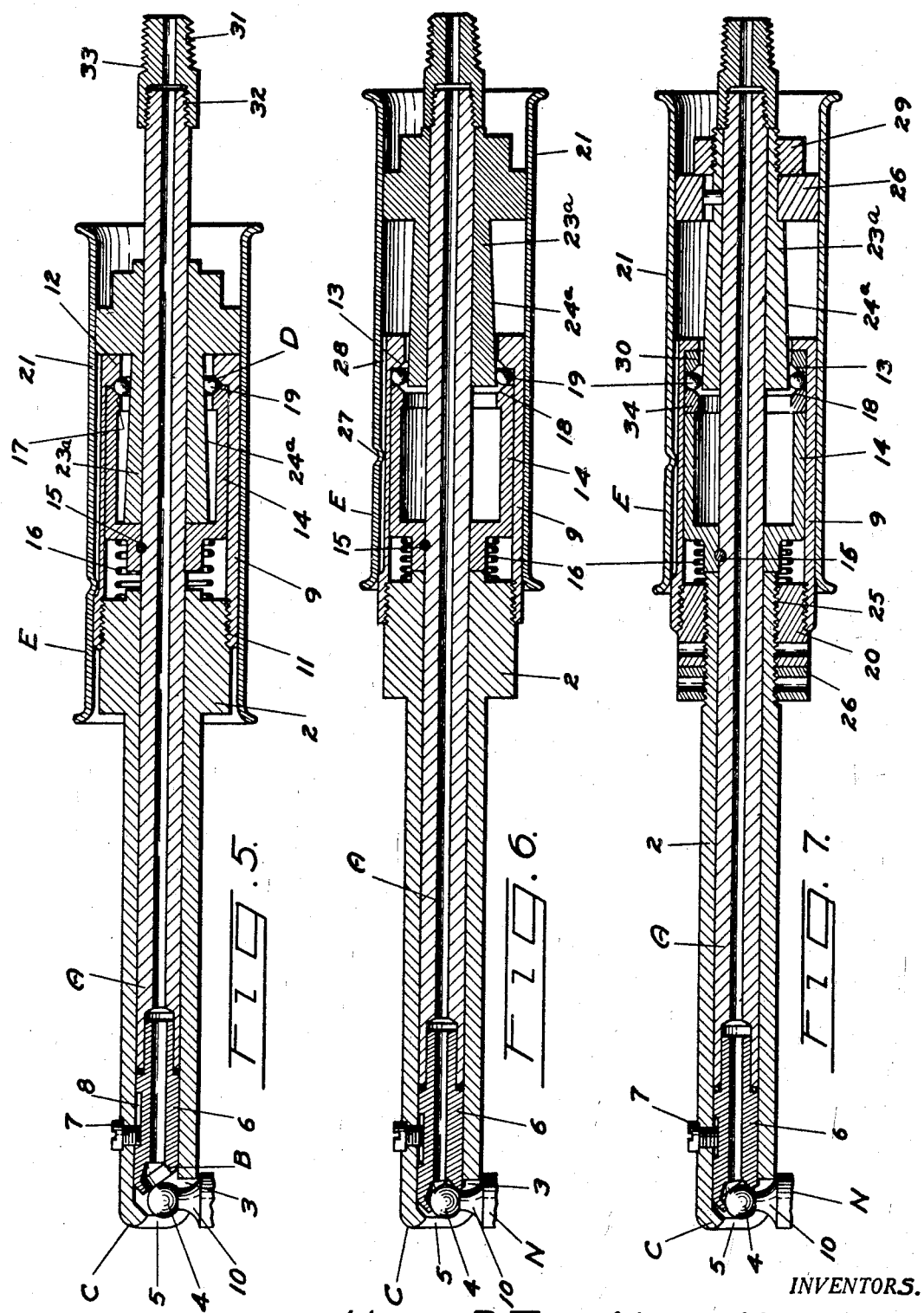

Patented Sept. 25, 1934

1,974,550

UNITED STATES PATENT OFFICE 1,974,550

LUBRICATING DEVICE

Harry R. Tear and Lloyd M. Andrews, South Bend, Ind., assignors to The Lubrication Corporation, South Bend, Ind., a corporation of Delaware Application March 25, 1932, Serial No. 601,160

15 Claims. (Cl. 285—143)

This invention relates to lubrication devices and more particularly to lubricant discharge nozzles, incorporating means for clamping the nozzle to a lubrication nipple or fitting as during high pressure lubricant servicing.

Nozzles of the type employed for discharging lubricant under high pressures to lubrication nipples or fittings require some means for clamping the nozzle in engagement tightly with the fitting so that the nozzle will not be forced away from the fitting by the lubricant pressure to which they are submitted. In the past many such clamping mechanisms have been provided, falling generally into one of the following generic types.

First, that type of mechanism incorporating screw thread, or bayonet lock structure, by means of which the nozzle is interconnected with complementary threads or with a pin on the nipple or fitting and drawn toward the fitting by rotation of the nozzle or associate parts; and Secondly, that type in which the fitting is drawn and held into engagement with the nozzle by clamping jaws or engaging members shaped to conform to the contour of the fitting body or head.

The present invention is embodied in mechanism of the latter type and is distinguished from clamp type nozzles heretofore provided in that a portion of the nozzle constituting the hand grip or manual engageable part comprises the clamp actuating member and, preferably, is mounted for right line movement along, or parallel with, the axis of the nozzle.

An object of the invention is to provide a lubricant discharge nozzle of the clamp type wherein the lubricant fitting is engaged and clamped tightly to the discharge nozzle orifice by right line movement of a tubular hand grip by which the nozzle is normally supported in use. This arrangement permits the clamp to be operated by only one hand of the user so that the other hand may be free for such other duties as, for instance, the operation of a control valve to establish flow of lubricant through the nozzle when it has been clamped in place upon the fitting.

Another object is to provide a clamp type lubricant discharge nozzle operable by manual actuation of a tubular hand grip along the axis of the nozzle and wherein the mechanism for operating the clamping elements is housed within the tubular hand grip.

Another object is to provide a clamp type lubricant discharge nozzle including a force multiplying clamp mechanism operable by right line movement of a hand grip along the axis of the nozzle incorporating means for adjusting the elements of the force multiplying mechanism whereby the clamping mechanism of the nozzle may be operated by minimum right line movement of the manually actuated hand grip.

A further object is to provide a clamp type lubricant discharge nozzle which is simple in structure, which may be economically manufactured and which may be operated with a minimum of manual effort.

Other objects, the advantages, and uses of the invention, will be, or should become apparent after reading the following description and claims and after consideration of the accompanying drawings forming a part of this specification in which:

Fig. 1 is a vertical sectional view of a clamp type discharge nozzle constructed in accordance with our invention, shown prior to engagement with a lubrication fitting;

Fig. 2 is a view similar to Fig. 1 but with the clamping mechanism shown in engagement with the fitting;

Fig. 3 is an enlarged end elevation of a discharge nozzle illustrated in Figs. 1 and 2;

Fig. 4 is a sectional view along the line IV—IV of Fig. 2;

Fig. 5 is a sectional view of a modified embodiment of our invention, shown prior to engagement with a fitting;

Fig. 6 is a view similar to Fig. 5, illustrating the nozzle in engagement with the fitting;

Fig. 7 is a sectional view illustrating a modification of the discharge nozzle shown in Figs. 5 and 6;

Fig. 8 is a sectional view of another embodiment of our invention shown with the nozzle engaged with the fitting;

Fig. 9 is a view similar to Fig. 8 illustrating the nozzle prior to engagement with the fitting; and Fig. 10 is a sectional view along the line X—X of Fig. 9.

In general our improved clamp type lubricant discharge nozzle comprises a lubricant conduit A having a discharge orifice B, a clamping member C adapted to clamp a lubricant fitting or nipple designated at N to the discharge orifice B, force multiplying mechanism D for causing relative movement between the clamping member C and the conduit A, and a manually operable member E associated with the mechanism D, whereby right line movement of the member E may operate the mechanism D to clamp the fitting N in engagement tightly with the discharge orifice B. It is contemplated that the member E and its associated parts shall be so constructed as to provide relative clamping movement between the member C and the orifice B upon right line movement in a direction predetermined at the time of manufacture.

The nozzle may thus be constructed broadly in one of two ways. It may be made to clamp the fitting when the hand grip sleeve or member E is pulled rearwardly away from the fitting or it may be made so as to clamp the fitting when the hand grip is pushed toward the fitting.

With reference to Figs. 1 to 4 of the drawings, we have illustrated therein one embodiment of our invention wherein the lubricant conduit A is slidably disposed within an elongated tubular body 2. The clamping member C is formed integrally with the body 2, at its forward end, and may be of the general type illustrated and described in Morris Reissue Patent No. 18,278. The member C has an opening 3 at one side thereof for admitting the enlarged spherical head 4 of the fitting N and has a constricted portion 5 of the opening 3 continuing across the outermost end. The inner walls of the clamp C are formed to engage with the spherical head 4 of the fitting regardless of the angular relationship between the axes of the conduit and the fitting. The nozzle may therefore be swung more than 90° in a counterclockwise direction about the center of the fitting from that position shown in Fig. 1 or Fig. 2 while engaged with the fitting. When the nozzle is so moved angularly with respect to the fitting, the neck 10 of the fitting N lies within the constricted portion 5 of the opening 3.

The conduit A has, at its forward end, a fitting engaging lubricant discharge nozzle member 6 of like diameter having the discharge orifice B formed in the outer end. The orifice B is large in diameter relative to the diameter of the opening to the lubricant passage through the fitting and is arranged to encompass a relatively large portion of the spherical head 4 of the fitting N, when engaged therewith, so that lubricant may be fed to the fitting throughout a wide range of axial relationships between the nozzle and fitting. A stud screw 7 extends laterally through the elongated portion of the body 2 and into a groove or notch 8 formed in the outer wall of the member 6 to maintain the discharge orifice B and the opening 4 of the clamping member C in register. Preferably the member 6 is formed as a separate part of the conduit A so that it may be heat treated for hardness suitable to its functions.

The mechanism D, for causing relative movement between the clamping member C and the conduit A, includes a tubular sleeve 9 secured to the body 2 by screw threads, as shown at 11, and extending rearwardly of the body. The outermost end of the sleeve 9 has an integral inwardly extending flanged portion 12 one wall of which is formed to provide an annular wedge surface 13 disposed substantially 45° from the axis of the sleeve 9. A second sleeve 14 is slidably disposed within the sleeve 9 and is fixed by a pin 15 to the conduit A. The sleeve 14 is shorter in length than the sleeve 9 and is arranged to move longitudinally thereof to cause relative movement between the body 2 and the conduit A when the head of the fitting N is being clamped between the clamping member C and the discharge orifice or nozzle B of the conduit. A compression spring 16 is disposed within the sleeve 9 between the adjacent ends of the body 2 and the sleeve 14. The sleeve 14 has an inwardly extending flanged portion 17 provided with a wedge surface 18 similar to the wedge surface 13 on that wall opposed to the wedge surface 13 of the flange 12. A series of steel balls 19, fourteen in the present instance, are disposed in annular array between the opposed wedge surfaces 13 and 18 associated with the body 2 and the conduit A respectively.

The manually engageable hand grip E, in the form of a sleeve 21, is disposed concentric with, and about, the body 2 and sleeve 9 and is secured by press fit, as shown at 22, to an elongated conical wedge member 23 which is slidably mounted upon the conduit A. The outer wall of the wedge member 23 presents a conical wedge surface 24 having a relatively low pitch. The balls 19 are engaged at all times with the wedge surfaces 13, 18 and 24. Means for preventing rotation of the sleeve 21 upon the body 2 and sleeve 9 comprises a projection 27 formed on the inner wall of the sleeve which extends into an elongated groove 28 formed on the outer wall of the sleeve 9.

A connecting stud 31 is secured by threaded engagement, as shown in 32, to the rearmost end of the conduit A and has an externally threaded portion 33 for connecting the nozzle with a lubricant conducting hose or other lubricant conducting or discharge apparatus. The inner end wall of the stud 31 acts as a stop against which the wedge member 23 may abut when the hand grip 21 is drawn rearwardly to disengage the nozzle and fitting.

The discharge nozzle thus described is usually connected to a lubricant dispensing apparatus by a flexible hose which is connected to the nozzle by engagement with the threaded portion 33 of the stud 31. The nozzle may be conveniently held in the hand of the operator by grasping the tubular sleeve or hand grip 21, the outer surface of which is preferably knurled to facilitate manual engagement.

Prior to connecting the nozzle with the fitting N the operator will draw the hand grip 21 rearwardly on the conduit A if the clamp members are not already apart. As the hand grip 21 and its associated wedge member 23 are drawn rearwardly away from the body 2, the spring 16 will cause relative movement of the sleeves 9 and 14, which movement is permitted due to the inward radial movement of the annularly arranged assembly of balls 19 as they follow the wedge surface 24 and are urged inwardly by the relative inward thrust exerted by the coacting wedge surfaces 13 and 18 on the sleeve members 9 and 14 respectively. This relative movement between the sleeve members 9 and 14 causes the member 6 with the discharge orifice B and the clamping member C to assume the position shown in Fig. 1. The nozzle is then moved so that the spherical head 4 of the fitting N is admitted through the opening 3 in the clamping member C as also shown in Fig. 1. If necessity compels the introduction of the discharge nozzle along an axis with respect to the fitting other than that shown in Fig. 1, such as on an axis common to the axis of the fitting, the head 4 of the fitting N is engaged with the clamping member by lateral movement of the clamping member over the head 4 the neck 10 of the fitting passing through the constricted portion 5 of the opening 3 at the end of the clamping member.

After initial engagement of the discharge nozzle and the fitting, as described, the clamping of the discharge orifice B in engagement tightly with the head 4 of the fitting is accomplished by the simple operation of moving the hand grip 21 forwardly as far as it will go. This forward movement of the hand grip and the relatively low pitch wedge surface 24 of the member 23 causes outward radial movement of the annular assembly of balls 19 between the wedge surfaces 13 and 18. This movement, by wedge like action of the steel balls 19 and wedge surfaces 13 and 18, forces the flanges 12 and 17 of the sleeves 9 and 14 respectively away from one another to cause relative movement between the member 6 with its discharge nozzle B and the clamping member C to clamp the fitting N in engagement tightly with the discharge orifice B of the conduit A.

In Figs. 5 and 6 we have shown a discharge nozzle of the clamp type which is identical in structure to that illustrated and described in connection with Figs. 1 to 4 except that the conical surface 24 of the wedge 23a is inclined in the opposite direction with respect to the body 2 as shown at 24a.

This simple change in the arrangement of the wedge surface provides a clamp type nozzle wherein the clamping function takes place upon rearward movement of the sleeve hand grip E and wherein the nozzle is released from engagement with the fitting by moving the sleeve forwardly.

Practical application of the discharge nozzle, as illustrated in Figs. 5 and 6 and that form shown in Figs. 1 to 4, has resulted in the finding that the arrangement wherein clamping of the fitting takes place by rearward movement of the hand grip E is preferable in that the weight of the hose connected to the nozzle by engagement with the connector stud 31 aids in maintaining the clamping mechanism unlocked when disengaged from the fitting by exerting a rearward pull upon the conduit A upon which the sleeve 14 is fixed. In other words the sleeve 14 when drawn rearwardly with the conduit by virtue of the weight of the hose moves the balls 19 along the wedge member 23a to cause the release of the clamping mechanism. The force multiplying function of the mechanism D however, is of such an order that the possibility of reversal of the clamping mechanism during use may not occur under ordinary circumstances.

In Fig. 7 we have shown a discharge nozzle which is similar to that shown in Figs. 5 and 6 except that the body 2 is connected to the sleeve 9 through the medium of an annular ring 20 which is engaged with the body 2 by screw threads 25 and therefore adjustable along the axis of the body. A locking nut 26 is provided for securing the member 20 in place after adjustment. This construction permits a very fine adjustment of the clamping mechanism so that a minimum travel of the hand grip sleeve E may accomplish the clamping of the fitting as well as its release.

The wedge member 23a in this modification is secured to an annular member 26 by a screw and nut assembly 29 thereby permitting the manufacture of the wedge member from stock of relatively small diameter.

In this form of the discharge nozzle the wedge surfaces 13 and 18 are formed on annular members 30 and 34 respectively which abut adjacent surfaces of the sleeves 9 and 14. This structure simplifies to a considerable extent the manufacture of the sleeves 9 and 14.

The discharge nozzle, as illustrated in Fig. 7, functions precisely in the same manner as that form described in Figs. 5 and 6.

In Figs. 8 to 10 we have shown an embodiment of the invention which is similar in many respects to that form previously described and wherein similar parts have been designated by similar reference numerals. The difference in structure lies largely in the use of the hand grip E as the wedge means for operating the force multiplying mechanism D therefore eliminating the separate wedge member 23. This construction permits a material reduction in the diameter of the assembly D and permits the use of a fewer number of steel balls which may be of relatively large diameter.

The clamping member C is not integral with the body 2', as in the form first described, but is secured thereto by screw threads 36. A sleeve 37 corresponding to the sleeve 9 is secured to the body 2' by screw threads 38. An externally threaded plug 39 is secured partially within the end of the sleeve 37 by engagement with an internally threaded portion 41 thereof and a locking ring 42 is disposed on the outer end of the plug 39 to lock the plug in place upon the sleeve. The plug 39 is formed with a central bore 43 through which a tubular member 44 forming a part of the conduit A extends. The conduit A further comprises a tubular member 45 secured to the member 44 by press fit and the clamping member C. The sleeve 37 has four relatively large openings 46 therethrough disposed 90° apart about the axis thereof and spaced away from the inner end of the plug 39.

A pair of rings 48 and 49 are disposed about the member 44 of the conduit A and are formed with opposed wedge surfaces 51 and 52 respectively corresponding to the wedge surfaces 13 and 18 of the discharge nozzle heretofore described.

The ring 48 bears upon the adjacent wall of the plug 39, and the ring 49 bears upon a flange 53 formed on the member 44. A compression spring 54 is disposed about the member 45 and its ends bear against the adjacent wall of the flange 53 and of the body 2' respectively. The spring 54 thus tends yieldingly to cause relative movement between the conduit A and the body 2' to move the member 6 with its discharge orifice B away from the outer end of the clamping member C. Steel balls 55, four in the present instance, are arranged to bear upon the opposed wedge surfaces 51 and 52 of the rings 48 and 49 respectively and are positioned within the openings 46 in the sleeve 37.

The hand grip member E comprises a tubular member 56 slidably mounted upon the body 2' and formed to provide diverging inner side walls 57 for engagement with the balls 55. The pitch of the walls 57 is relatively low and comparable to the pitch of the wedge surface 24 of the mechanism illustrated in Figs. 1 to 7. The member 56 is further formed with an enlarged internal diameter as shown at 58 at the outer end including a continuation of the surfaces 57 whereby inward radial movement of the balls 55 is rapidly accelerated during the initial rearward movement of the hand grip sleeve 56.

In operation the discharge nozzle illustrated in Figs. 8 to 10 is employed in precisely the same manner as that described in connection with Figs. 1 to 7 of the drawings. The structure, however, lends itself to a more compact assembly of parts, of greater strength due to increased sizes of parts in the greater space available, and the same ease of operation, that of merely moving the hand grip sleeve 56 rearwardly to clamp the fitting and that of moving the member forwardly to disengage the fitting. A split ring 59 is fixed to the body 2' as shown in Figs. 8 and 9 to act as a stop for the member 56 upon forward movement of the member as in releasing the fitting.

It is to be understood that the above described embodiments of the invention herein set forth are presented for the purpose of illustration only, and various changes may be made therein without departing from the spirit and scope of the invention.

We claim:

1. In a clamp type lubricant discharge nozzle, a lubricant conduit having a discharge orifice, clamping means for clamping a lubrication fitting to said discharge orifice, and manually operable means for operating said clamping means comprising a sleeve formed with conical inner side walls and force multiplying mechanism interposed between said clamping means, said conduit and the inner conical walls of said sleeve whereby right line movement of the sleeve operates said force multiplying mechanism to move said conduit and said clamping means relatively to each other.

2. In a clamp type lubricant discharge nozzle, a lubricant conduit having a discharge orifice, clamping means for clamping a lubrication fitting to said discharge orifice, and manually operable means for operating said clamping means comprising a sleeve formed with conical inner side walls and force multiplying mechanism interposed between said clamping means, said conduit and the inner conical walls of said sleeve whereby right line movement of the sleeve may operate said clamping means, said sleeve being fashioned to provide a hand grip for manually supporting the discharge nozzle when in use.

3. In a clamp type lubricant discharge nozzle, a lubricant conduit having a discharge orifice, clamping means for clamping a lubrication fitting to said discharge orifice, and manually operable means for operating said clamping means comprising a sleeve formed with conical inner side walls, and force multiplying mechanism, including elements having a wedging function, interposed between said clamping means, said conduit and the inner conical walls of said sleeve whereby right line movement of the sleeve operates said force multiplying mechanism to move said conduit and said clamping means relatively to each other.

4. In a clamp type lubricant discharge nozzle, a lubricant conduit having a discharge orifice, a clamping member, and means for producing right line relative movement between said conduit and said clamping member, said means including a pair of wedge members one associated with said conduit and the other with said clamping member and arranged with their wedge surfaces facing one another, an element having a wedging function registering with said wedge surfaces, and manually operable means including a sleeve enclosing said element and surfaces for moving said element between said wedge surfaces.

5. In a clamp type lubricant discharge nozzle, a lubricant conduit having a discharge orifice, a clamping member, and means for producing right line relative movement between said conduit and said clamping member, said means including a pair of wedge members one associated with said conduit and the other with said clamping member and arranged with their wedge surfaces facing one another, an element having a wedging function registering with said wedge surfaces, and manually operable means including a tubular sleeve housing said element and surfaces and adapted for right line movement along the axis of said conduit for moving said element between said wedge surfaces.

6. In a clamp type lubricant discharge nozzle, a lubricant conduit having a discharge orifice, a clamping member, and means for producing right line relative movement between said conduit and said clamping member, said means including a pair of wedge members one associated with said conduit and the other with said clamping member and arranged with their wedge surfaces facing one another, a plurality of metal balls having a wedging function registering with said wedge surfaces, and manually operable means including a tubular sleeve having an internal wedge surface mounted for right line movement along the axis of said conduit for moving said metal balls between said wedge surfaces.

7. In a clamp type lubricant discharge nozzle, a lubricant conduit having a discharge orifice, clamping means for clamping a lubrication fitting to said discharge orifice, and manually operable means for operating said clamping means comprising a pair of wedge members arranged with their wedge surfaces facing one another, a pair of members structurally independent of said wedge members for connecting said wedge members with said conduit and with said clamping element respectively, at least one of said members being adjustable with respect to the said element associated therewith, movable elements having a wedging function engageable with the wedge surfaces of said wedge members, and a movable hand grip, having a wedge engaging with said wedging elements, for moving the elements between said pair of wedge members to cause relative movement of said conduit and clamping elements.

8. In a clamp type discharge nozzle, an elongated body formed at its outer end to provide a fitting engaging clamp member, a conduit slidably disposed within said body having a discharge orifice at the outer end, means for causing relative movement between said body and said conduit to clamp a lubrication fitting between said clamping member and said discharge orifice, said means including force multiplying mechanism associated with the body and with the conduit and a tubular hand grip embracing and mounted for longitudinal movement upon said body for operating said force multiplying means.

9. A clamp type lubricant discharge nozzle comprising a lubricant conduit having a discharge outlet, a clamping member associated with said conduit, manually operable means for causing relative movement between said clamping member and said conduit to secure a lubricant nipple therebetween in registration with said discharge orifice, said means comprising a cone shaped wedge member slidably mounted upon said conduit, a sleeve forming a hand grip secured to said wedge member, a pair of wedge members structurally independent of the conduit and clamping member and one associated with said conduit and one with said clamping member disposed concentric with said conduit and having their wedge surfaces facing one another and a plurality of metal balls engaging with said wedge surfaces and with said cone shaped wedge.

10. In a clamp type discharge nozzle, a lubricant conduit having a discharge orifice, clamping means for clamping a lubrication fitting to said discharge orifice, and manually operable means for operating said clamping means, comprising a pair of wedge members arranged with their wedge surfaces facing one another, a pair of members structurally independent of the conduit and the clamping member for connecting said wedge members with said conduit and said clamping element respectively, a compression spring associated with said pair of members to hold the clamping member yieldingly away from said discharge orifice, movable elements having a wedging function engageable with the wedge surfaces of said wedge members and a movable hand grip having a wedge engaging with said wedging elements for moving the elements between said pair of wedge members to cause relative movement of said conduit and said clamping elements.

11. In a clamp type lubricant discharge nozzle, a lubricant conduit having a discharge orifice, a clamping member, and means for producing right line relative movement between said conduit and said clamping member, said means comprising a pair of telescopically mounted sleeves, one of said sleeves being secured to said conduit and adjustable means for securing the other sleeve to said clamping member, a pair of wedge members one associated with each of said sleeves and arranged with their wedge surfaces facing one another, a plurality of metal balls having a wedging function registering with said wedge surfaces, and manually operable means including a tubular hand grip concentric with and movable along the axis of said conduit for moving said metal balls between said wedge surfaces.

12. In a lubrication device, a clamp type nozzle comprising a conduit having a discharge orifice, a clamping member adapted to clamp a lubrication nipple to said discharge orifice, a tubular hand grip having an internal cam surface movable along the axis of said conduit, and means associated with said conduit and with said clamping member and cooperative with said internal cam surface of said tubular hand grip for translating right line movement of said hand grip to right line relative movement between said conduit and said clamping member.

13. In a lubricating device, a pair of cooperating elements adapted, upon relative movement, to clamp a lubricant nipple therebetween, one of said elements comprising a conduit for conducting lubricant to said nipple, a manually operable sleeve encompassing said cooperating elements and arranged for right line movement parallel to the axis of said conduit, and means movable in a path transverse to said axis and responsive to movement of said sleeve and cooperating with said conduit and said clamping member for causing relative movement of said cooperating elements.

14. A lubricating device comprising, a conduit having one end formed to provide a lubricant discharge orifice for engagement with a lubricant receiving nipple, a clamping member movably mounted upon said conduit and adapted to engage with and clamp said nipple against said discharge orifice upon relative movement between said clamping member and said nozzle, force multiplying means including a plurality of metal balls and cam members associated with said conduit and said clamping member, a sleeve encompassing said conduit and arranged to move along the axis thereof and cooperating with said balls for actuating said force multiplying means on right line movement of said sleeve to cause relative movement between said clamping member and said conduit.

15. In a clamp type lubricant discharge nozzle, a lubricant conduit having a discharge orifice, clamping means for clamping a lubricant receiving nipple to said discharge orifice, manually operable means for operating said clamping means comprising a sleeve formed with diverging inner side walls, a portion of which diverge from the axis of the sleeve at a greater angle than the remaining wall portions, force multiplying means interposed between said clamping means, said conduit and the inner diverging walls of said sleeve whereby right line movement of the sleeve may operate to move said clamping means and conduit relatively to each other through engagement of the diverging wall portions of the sleeve with the force multiplying mechanism.

HARRY R. TEAR.
LLOYD M. ANDREWS.